United States Patent [19]

Sato

[11] Patent Number: 4,775,933

[45] Date of Patent: Oct. 4, 1988

[54] ADDRESS GENERATION SYSTEM

[75] Inventor: Yoshikuni Sato, Tokyo, Japan

[73] Assignee: NEC Corporation, Tokyo, Japan

[21] Appl. No.: 944,168

[22] Filed: Dec. 22, 1986

[30] Foreign Application Priority Data

Dec. 20, 1985 [JP] Japan .............................. 60-288789

[51] Int. Cl.⁴ ............................................. G60F 9/36
[52] U.S. Cl. ................................................. 364/200
[58] Field of Search ... 364/200 MS File, 900 MS File

[56] References Cited

U.S. PATENT DOCUMENTS

| | | | |
|---|---|---|---|
| 4,197,578 | 4/1980 | Wada et al. | 364/200 |
| 4,539,635 | 9/1985 | Boddie et al. | 364/200 |
| 4,731,736 | 3/1988 | Mothersole et al. | 364/200 |

*Primary Examiner*—Gareth D. Shaw
*Assistant Examiner*—Debra A. Chun
*Attorney, Agent, or Firm*—Foley & Lardner; Schwartz, Jeffery, Schwaab, Mack, Blumenthal & Evans

[57] ABSTRACT

An address generation system comprising a decoder for decoding an addressing field of a given instruction code, and a control circuit connected to the decoder to cause a register to be read out in accordance with the decoded information. A hold circuit is connected to the decoder to hold an address generation information for generating an address of an operand. A correction number generator is connected to the hold circuit to generate a correction number determined in accordance with the address generation information for the designated register. An adder is provided to receive the correction number and the content read out from the register and to output the content of the register modified by the correction number.

9 Claims, 2 Drawing Sheets

ADDRESS GENERATION SYSTEM

BACKGROUND OF THE INVENTION

1. Field of the Invention

The present invention relates to an address generation system for use in data processors, and more specifically, to an address generation system for accessing an operand used in instruction execution.

2. Description of Related Art

Heretofore, as concerns the addressing of memory in which operands are stored the following two methods have been wellknown. The first method is a so-called "pre-decrement system" in which before address generation for accessing operand a content of a register is substracted by the value indicated by the word length and so on, and the substracted value is used as an address of operand. The second method is a so-called "post-increment system" in which the content of a register is used as it is for address generation, and thereafter the content of the register is added with the value indicated by the word length and so on, and the added value is written back into the same register. The pre-decrement system and post-increment system will be generically called "register modify type" or "register modification type" hereinafter.

Referring to FIG. 1, there is shown one example of a conventional address generation control apparatus of the register modify type. The shown control apparatus includes a decoder 31 receiving an addressing field 311 contained in a given instruction code for indicating various items of address generation. A decoded signal is applied to a register control circuit 32 through a decoded signal line 312. This control circuit 32 responds to the information on the decoded signal line 312 to control the read/write of an associated group of registers 33 through a control line 314 and the operation of an associated incrementer/decrementer 34 through another control line 313. The group of registers 33 includes at least one register adapted to hold an address for accessing operand used in an instruction execution, and is coupled to the incrementer/decrementer 34 through a data line 315. The incrementer/decrementer 34 operates, under the control of the control circuit 32, to increment or decrement the content of the data outputted on the data line 315 from one register of the register group 33. When an instruction is executed in an execution unit 35, the register group 33 and the incrementer/decrementer 34 are controlled by an execution control unit 36.

In the address generation control apparatus as mentioned above, when the decoder 31 decodes the address field 311 in a given instruction code, if a register modification is detected, the control circuit 32 responds to the data on the decoded signal line 312 so as to carry out the following control operation.

In the case of pre-decrement, the control circuit 32 controls the register group 33 through the control line 314 so that the content of a register designated by the decoded data is outputted to the data line 315. Then, the control circuit 32 operates the incrementer/decrementer 34 through the control line 313, so that the incrementer/decrementer 34 reads and decrements the data on the data line 315 and outputs the decremented data to the data line 315. The decremented data on the data line 315 is written under the control of the control circuit 32 back to the register from which the data has been read out to the data line 315. Thereafter, the decremented data in the same register is read and outputted through a data line 316 to an address adder (not shown).

In the case of post-increment, the content of a register by the decoder 31 is read to the data line 316 and then supplied to the address adder. On the other hand, the content of the same register is also outputted through the data line 315 to the incrementer/decrementer 34. The incrementer/decrementer 34 operates under the control of the control circuit 32 to increment the data supplied through the data line 315 and to output the incremented data back to the data line 315. As a result, the incremented data is written back to the register from which the data has been read out to the data lines 315 and 316.

In the above mentioned address generation control circuit, when a register modification control is carried out for address generation of operands, it is necessary to modify the content of a register provided in the execution unit 35 every time the register modification is designated for address generation of operand. If one instruction contains two or more operands, every time the register modification is designated in the course of the address generation of the operands, the increment-/decrement operation has to be performed to modify the content of the register concerned. Accordingly, in the case that instructions are processed in a pipeline manner with two units, i.e., an instruction decode/address computation unit and the instruction execution unit, even if the instruction decode/address computation unit is required to modify a register in the instruction execution unit, if the instruction under execution in the execution unit involves the register which is required to be modified, the address computation cannot be carried out until the use of the register concerned has been completed in the instruction execution unit. Otherwise, the content of the register concerned would be changed before it is used in the instruction execution unit. Namely, the pipeline operation is temporarily stopped.

In the past, in order to solve the above mentioned problem, there has been proposed to provide in the instruction decode/address computation the same register group as that provided in the instruction execution unit, so that the register modification can be controlled independently of the instruction execution unit. However, to realize this method, the scale of the register becomes too large. In addition, when one register is written in the instruction execution unit, the content of that register must be copied to the corresponding register provided in the instruction decode/address computation unit. To the contrary, if the content of one register is modified in the instruction decode/address computation unit, the modified content of that register must be copied to the corresponding register provided in the instruction execution unit. Therefore, the control of the registers becomes too complicated.

SUMMARY OF THE INVENTION

Accordingly, it is an object of the present invention to provide an address generation system which has solved the above mentioned drawbacks of the conventional systems.

Specifically, an object of the present invention is to provide an address generation system for use in a pipelined data processor, which system has a simple structure and can carry out the register modification without disturbing the pipeline operation.

The above and other objects of the present invention are achieved in accordance with the present invention by an address generation system for generating an address of an operand. The address generation system modifies a content of a register used in an instruction execution unit in accordance with the data included in the addressing field of a given instruction code. This address generation system includes a decoder for decoding an addressing field of a given instruction code, a register control circuit connected to the decoder to cause the register to be read out in accordance with the decoded information, a hold circuit connected to the decoder to hold an address generation information for accessing an operand, a correction number generates connected to the hold circuit to generate a correction number determined in accordance with the address generation information for the designated register, and means for modifying the content read out from the register by the correction number.

When a memory address for one operand is computed, the correction number generator outputs one correction number determined by the modification information held in the holding circuit for the operand concerned and the address generation information outputted from the decoder for the operand concerned. Thus, the modifying means operates to modify the content outputted from the register concerned by the correction number outputted from the correction number generate.

Further, in accordance with the present invention, there is provided an address generation system for use in a data processor of such an addressing system that the content of registers used for address generation is modified in accordance with the indication of the addressing field contained in a given instruction, comprising:

an instruction execution unit including a register group having at least one register used in instruction execution, an incrementer/decrementer associated to the register group, and a control unit for controlling the register group and the incrementer/decrementer so that the content of a designated register is modified by the incrementer/decrementer; and an instruction decode/address computation unit including a decoder for decoding an addressing field of a given instruction code, a control circuit connected to the decoder to cause the register to be read out in accordance with the decoded information, a hold circuit connected to the decoder to hold an address generation information for accessing an operand, a correction number generator connected to the hold circuit to generate a correction number determined in accordance with the address generation information for the designated register, and means for modifying the content read out from the register by the correction number.

In one embodiment of the present invention, the modifying means is an adder receiving the correction number and the content read out from the register. Further, the control circuit of the execution unit is connected to the hold circuit so as to control the incrementer/decrementer so that the content of the register is actually modified when the instruction requiring the register modification is actually executed in the execution unit.

In addition, the hold circuit includes a plurality of hold sections each adapted to store the address generation information on one of a plurality of operands included in one instruction. Specifically, each of the holding sections includes a first field for storing whether or not the register modification is required, a second field for storing the direction of the modification required, and a third field for storing the register number for which the modification is required.

Furthermore, the correction number generator generates the correction number N expressed in the following formulae:

N = X-Z-1 in case of pre-decrement
N = X-Z in case of post-increment or no modification where X is the number of the post-increments in the past and Z is the number of the pre-decrements in the past.

The above and other objects, features and advantages of the present invention will be apparent from the following description of the preferred embodiment of the invention with reference to the accompanying drawings.

DESCRIPTION OF THE PREFERRED EMBODIMENT

Figure 2:
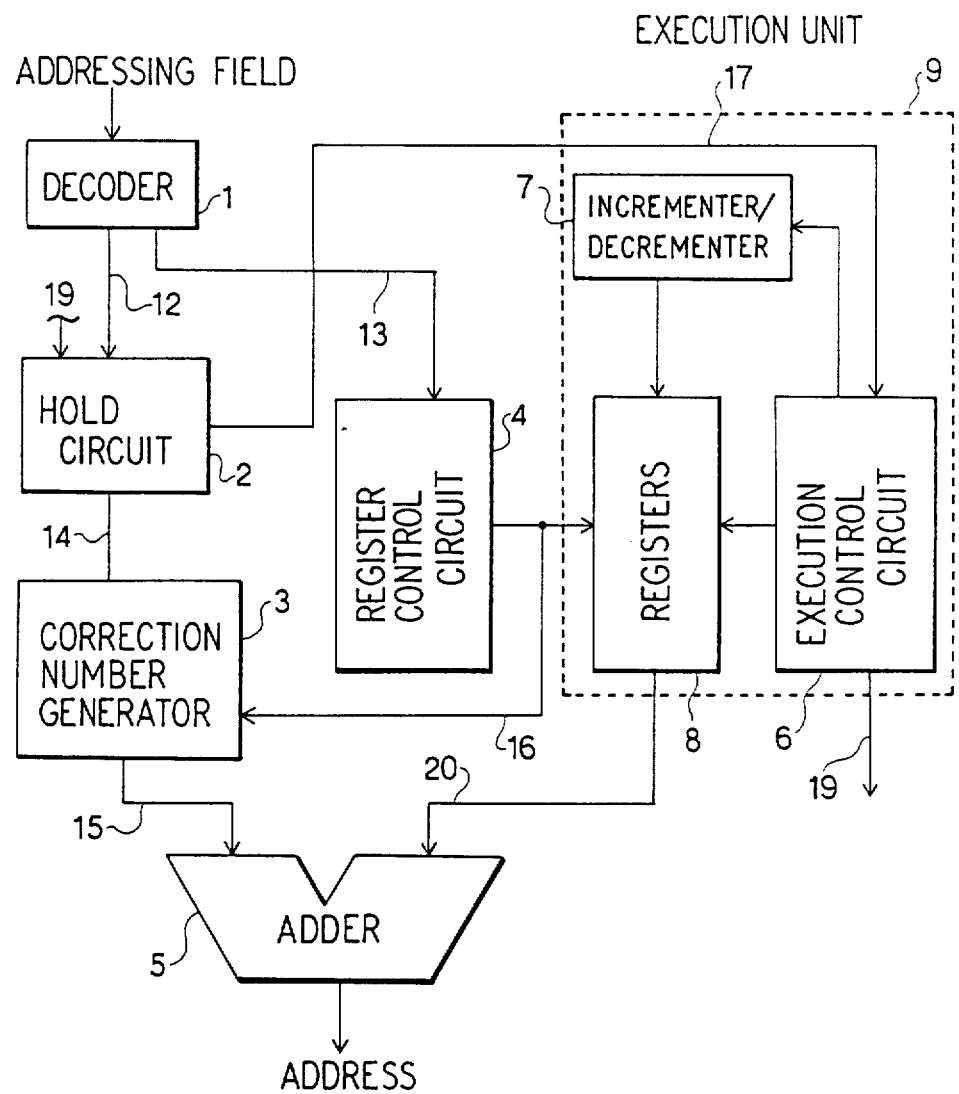
FIG. 2 is a block diagram of one embodiment of the address generation system in accordance with the present invention.

Referring to FIG. 2, there is shown one embodiment of the address generation system in accordance with the present invention. The shown system includes a decoder 1 receiving an addressing field of a given instruction code so as to output various items of address generation information to an address information hold circuit 2 and a register control circuit 4 through decoder lines 12 and 13, respectively. The address information hold circuit 2 is adapted to hold information of the register modification for accessing an operand, which is outputted from the decoder 1, and to output the register modification information to an associated correction number generator 3 through a line 14. The generator 3 operates to generate a correction number determined by the information held in the hold circuit 2 and the register number designated by the register control circuit 4, and to output the correction number to an adder 5. On the other hand, the register control circuit 4 receives the decoded data from the decoder 1 and generates a control signal including a register designation information to a register group 8 capable of holding at least an address, so that a register of the register group 8 (address register) required for address computation is read out. Also, the register control circuit 4 outputs the register designation information to the correction number generator 3 through a control line 16. The adder 5 receives at its one input the correction number outputted from the generator 3 through a data line 15 and at its other input the content of the designated register in the register group 8 outputted through a data line 20. The adder 5 outputs the result of addition as an address. Incidentally, the adder 5 may be an adder used for ordinary address generation, or may be an adder independently provided for this specific purpose.

The shown system also includes execution control circuit 6 for controlling the read/write of the register group 8 and the operation of an associated incrementer/decrementer 7. Therefore, the incrementer/decrementer 7 operates under control of the execution control circuit 6 to modify the content of one register in the register group 8.

In the above mentioned system, the decoder 1, the hold circuit 2, the correction number generator 3, the control circuit 4, and the adder 5 are included in an instruction decode/address computation unit, and the execution control circuit 6, the incrementer/decrementer 7 and the register group 8 are included in an instruction execution unit 9. Therefore, these elements are operated independently in a pipelined manner.

The system having the construction mentioned above operates as follows:

The decode 1 decodes the addressing field of a given instruction code and outputs the decoded data to the hold circuit 2 and the register control circuit 4 through the decoded signal lines 12 and 13, respectively.

The hold circuit 2 holds, for each of operands contained in the decoded data, the information as to whether the register modification was designated in the past, and the direction and the number of the modification made by the incrementer/decrementer 7 (for example, the minus sign indicates the pre-decrement and the plus sign shows post-increment). The number of the modification informations stored in the hold circuit 2 is determined by the depth of a queue in the respective stages of the instruction decode/address computation unit, the difference between the respective stages in average execution time, etc.

On the other hand, the register control circuit 4 responds to the decoded data to designate a register of the register group 8 required for the address computation and to cause the content of the designated register to be outputted through the data line 20 to the adder 5. Also, the control circuit 4 supplies the correction number generator 3 with the register designation information, i.e., the register number of the register read by the register control circuit 4.

Thus, the correction number generator 3 examines the information held in the hold circuit 2 concerning the register of the designated register number, and determines a correction number on the basis of whether or not the register modification is currently required, the direction and number of the register modification required, whether or not the register modification was made in the past, and the direction and number of the register modification made in the past. Here, the term "past" indicates the time before the modification will be actually carried out in the instruction execution unit. The correction number thus determined is fed to the adder 5 through the data line 15.

Specifically, if the designated register is not subjected to register modification in the past, the correction number generator 3 outputs "−1" in the case that the pre-decrement is required currently, and "0" in the case of no requirement of register modification and in the case of a post-increment being required. If the designated register is subjected to only one pre-decrement in the past, the correction number generator 3 outputs "−2" when the pre-decrement is required currently, and "−1" in the case of post-increment or no register modification. To the contrary, if the designated register is subjected to only one post-increment in the past, the correction number generator 3 outputs "0" in the case of pre-decrement being currently required and "+1" in the case of no register modification or post-increment being currently required.

Thus, the output N of the correction number generator 3 can be expressed as follows:

$N = X - Z - 1$ in case of pre-decrement
$= X - Z$ in case of post-increment or no modification where X is the number of the post-increments carried out in the designated register in the past, and Z is the number of the pre-decrements carried out in the past.

The adder 5, which receives the correction number thus generated, adds the correction number to the content of the designated register read out by the register control circuit 4, and outputs the result of the addition as the address for a memory operand or the basic information for the address computation.

Thus, the effect of the register modification can be obtained in the instruction decode/address computation without actually modifying the content of the register designated. But, it is necessary to actually modify the register designated in the register group before or after execution of the instruction which has required the modification of the designated register. For this purpose, the content of the hold circuit 2 is fed through a control line 17 to the execution control circuit 6 in the instruction execution unit, so that, the information of the data held in the hold circuit 2 concerning the instruction currently executed in the instruction execution unit is inputted to the execution control circuit 6. As a result, the content of the designated register is actually incremented or decremented by the increment/decrementer 7 under control of the execution control circuit 6. Thereafter, the information held in the hold circuit 2 concerning the register thus incremented or decremented is invalidated.

In the above mentioned system, the hold circuit 2 must hold the correspondence between the instructions and the operand and the record of the modification of the respective registers. For this purpose, the hold circuit 2 can be constructed as shown in FIG. 3.

Figure 1:
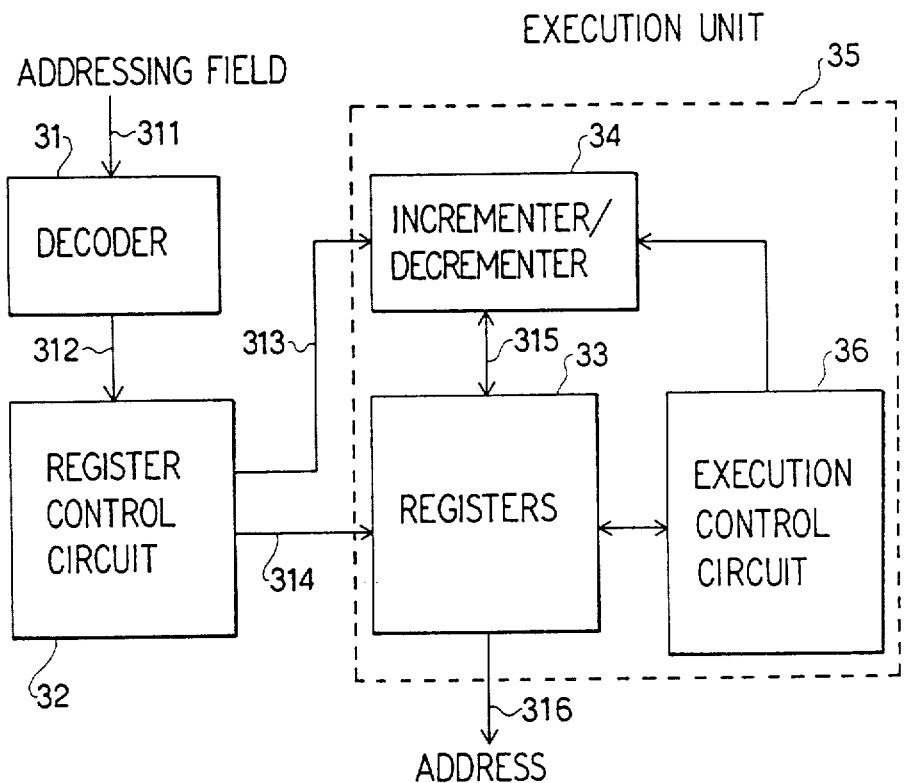
FIG. 1 is a block diagram showing one example of a conventional register modifying system.
Figure 3:
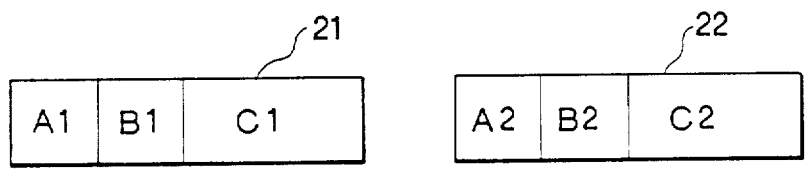
FIG. 3 illustrates an example of the structure of the holding circuit included in the system shown in FIG. 2.

FIG. 3 illustrates a recording structure of the hold circuit for one instruction including two operands at maximum. As seen from FIG. 3, the hold circuit includes two hold sections 21 and 22. The hold section 21 is adapted to be used when a first operand included in a given instruction code is required to be register-modified. This hold section 21 includes a field $A_1$ storing an effective bit indicative of whether or not the register modification is required, a field $B_1$ storing information on whether the required register modification is plus or minus, and a field $C_1$ storing the register number of the register required to be modified. The hold section 22 is used when a second operand included in a given instruction code is required to be register-modified, and includes field $A_2$, $B_2$ and $C_2$ corresponding to be field $A_1$, $B_1$ and $C_1$ of the hold unit 21. Thus, with these hold sections 21 and 22, it is possible to process a given instruction code including two operands at maximum.

The information thus stored in the hold circuit is used as follows: If the register modification is required regarding to the first operand, since all the register modifications required in the proceeding instructions have already been carried out in this embodiment, it is necessary to generate a correction number corresponding to the condition $X = Z = 0$ in the above mentioned formulae. In other words, when it starts to decode a new instruction, since the register modification required by the proceeding instruction has been completed and the effective bit $A_1$ in the hold circuit has been invalidated, the correction number generator will generate "−1" in case of pre-decrement and "0"0 in case of post-increment or no modification.

On the other hand, when the second operand is decoded, if the register modification is not required in the first operand (the effective bit $A_1$ in the hold section 21 is "0"), or even if the register modification is required in the first operand, if a register designated in the second operand is different from the required in the first operand, there is generated a correction number similar to that generated for the first operand. But, if the register modification has been required in the first operand (the effective bit $A_1$ in the hold section 21 is "1") and if the register modification is required again in the second operand for the register which has been required to be modified in the first operand, the correction number generator outputs a correction number in accordance with the condition $X=1$ and $Z=0$ in the case of the pre-decrement being required in the first operand, or in accordance with the condition $X=0$ and $Z=1$ in the case of the post-increment being required in the first operand. In addition, the information of the register modification on the second operand is also stored in the hold section 22.

The information thus stored in the hold sections 21 and 22 is held, until the instruction, from which has been introduced the information stored in the hold sections 21 and 22, is passed from the instruction decode-/address computation unit to the instruction execution unit so that the register modification is actually carried out. The information held in the hold circuit is invalidated after the register or the registers have been actually modified in accordance with the information held in the hold circuit.

In the embodiment mentioned above, the hold circuit has two hold section so as to comply two operands contained in one instruction. But, the hold circuit can have three or more hold sections so that the system can process an instruction having three or more operands.

As seen from the above, in the address generation system in accordance with the present invention, the hold circuit holds the information of the register modification on the register which has been required to be modified in the past but has not yet modified out in the instruction execution unit. The information held in the hold circuit is then compared with the decoded information necessary for address computation, so that, the register modification processing which has to be precedently carried out in the instruction decode/address computation unit, can be virtually performed by using the result of the comparison without actually modifying the content of the register concerned. Namely, the instruction decode/address modification unit can carry out the register modification processing independently at some degree of the operation of the instruction execution unit. Therefore, the disturbance of the pipelined operation caused by the register modification can be suppressed. In addition, this effect can be obtained with a relatively small increase of hardware such as addition of a circuit for holding the register number, in comparison with the provision of a copy register in the instruction decode/address computation unit.

The invention has thus been shown and described with reference to specific embodiments. However, it should be noted that the invention is in no way limited to the details of the illustrated structures but changes and modifications may be made within the scope of the appended claims.

I claim:

1. An address generation system comprising a decoder for decoding an addressing field of a given instruction code, a register control circuit connected to the decoder to cause a register to be read out in accordance with the decoded information, a hold circuit connected to the decoder to hold address generation information for generating an address of an operand, a correction number generator connected to the hold circuit and the register control circuit to generate a correction number determined in accordance with the address generation information for the register, and means for modifying the content read out from the register by the correction number.

2. A system claimed in claim 1 wherein the modifying means comprises an adder receiving the correction number and the content read out from the register.

3. A system claimed in claim 1 further including an incrementer/decrementer associated with the register, and a second control circuit connected to the hold circuit to control the incrementer/decrementer so that the content of the register is actually modified when the instruction requiring the register modification is actually executed.

4. An address generation system for use in a data processor of such an addressing system that the content of registers used for address generation is modified in accordance with the indication of the addressing field contained in a given instruction, comprising:
an instruction execution unit including a register group having at least one register used in instruction execution, an incrementer/decrementer associated with the register group, and a control unit for controlling the register group and the incrementer/decrementer so that the content of a designated register is modified by the incrementer/decrementer; and
an instruction decode/address computation unit including a decoder for decoding an addressing field of a given instruction code, a control circuit connected to the decoder to cause the register to be read out in accordance with the decoded information, a hold circuit connected to the decoder to hold address generation information for accessing an operand, a correction number generator connected to the hold circuit and the control circuit to generate a correction number determined in accordance with the address generation information for the designated register, and means for modifying the content read out from the designated register by the correction number.

5. A system claimed in claim 4 wherein the modifying means comprises an adder receiving the correction number and the content read out from the designated register.

6. A system claimed in claim 4 wherein the control unit of the execution unit is connected to the hold circuit so as to control the incrementer/decrementer so that the content of the designated register is actually modified when the instruction requiring the designated register modification is actually executed in the execution unit.

7. A system claimed in claim 4 wherein the hold circuit includes a plurality of hold sections each adapted to store the address generation information on one of a plurality of operands included in one instruction.

8. A system claimed in claim 7 wherein each of the holding sections includes a first field for storing whether or not the register modification is required, a second field for storing the direction of the modification required, and a third field for storing the register number for which the modification is required.

9. A system claimed in claim 4 wherein the correction number generator generates the correction number N expressed in the following formulae:
$N=X-Z-1$ in case of pre-decrement
$N=X-Z$ in case of post-increment or no modification
where X is the number of the post-increments in the past and Z is the number of the pre-decrements in the past.

* * * * *